United States Patent
Wu et al.

(10) Patent No.: US 10,049,266 B2
(45) Date of Patent: Aug. 14, 2018

(54) PEOPLE COUNTING METHOD AND APPARATUS

(71) Applicant: Intel Corporation, Santa Clara, CA (US)

(72) Inventors: Michael Wu, San Jose, CA (US); Addicam V. Sanjay, Gilbert, AZ (US)

(73) Assignee: Intel Corporation, Santa Clara, CA (US)

(*) Notice: Subject to any disclaimer, the term of this patent is extended or adjusted under 35 U.S.C. 154(b) by 211 days.

(21) Appl. No.: 14/866,377

(22) Filed: Sep. 25, 2015

(65) Prior Publication Data
US 2017/0091540 A1    Mar. 30, 2017

(51) Int. Cl.
| | |
|---|---|
| H04N 7/18 | (2006.01) |
| G06K 9/00 | (2006.01) |
| H04N 5/247 | (2006.01) |
| H04N 9/04 | (2006.01) |
| G06T 7/20 | (2017.01) |

(52) U.S. Cl.
CPC ..... *G06K 9/00369* (2013.01); *G06K 9/00771* (2013.01); *G06T 7/20* (2013.01); *H04N 5/247* (2013.01); *H04N 9/04* (2013.01); *G06T 2207/30196* (2013.01); *G06T 2207/30242* (2013.01)

(58) Field of Classification Search
CPC .......... G06K 9/00362; G06K 9/00771; G06K 9/00624; G06T 7/20; G06T 2207/30242
See application file for complete search history.

(56) References Cited

U.S. PATENT DOCUMENTS

| | | | | |
|---|---|---|---|---|
| 2012/0063637 | A1* | 3/2012 | Tardif | G06T 11/00 382/103 |
| 2012/0226450 | A1* | 9/2012 | Olson | G01F 23/00 702/55 |
| 2014/0139633 | A1* | 5/2014 | Wang | G06K 9/00201 348/46 |
| 2015/0029339 | A1* | 1/2015 | Kobres | H04N 7/181 348/150 |

* cited by examiner

*Primary Examiner* — Sathyanaraya V Perungavoor
*Assistant Examiner* — Peet Dhillon
(74) *Attorney, Agent, or Firm* — Schwabe, Williamson & Wyatt, P.C.

(57) ABSTRACT

Described are apparatuses, methods and storage media associated with detecting and counting people, including use of RGB and range cameras with overlapping fields of view and methods which count people in range camera stream and which characterize behavior as recognized in RGB stream.

24 Claims, 9 Drawing Sheets

PEOPLE COUNTING METHOD AND APPARATUS

TECHNICAL FIELD

The present disclosure relates to the field of computing. More particularly, the present disclosure relates to detecting and quantifying the presence of people without a trained artificial intelligence system.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Trained feature detection algorithms are known and used to detect people; examples include Haar-like feature identification, histogram of oriented gradients ("HOG") descriptors, scale-invariant feature transform ("SIFT") identification, and speeded-up robust feature ("SURF") detection. However, such algorithms require training, may be computationally expensive, and have difficulty compensating for overlaps in the object that they trained to identify. Overhead cameras are also used to detect people, though these cannot detect whether a human is interested in specific shelf or product thereon.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
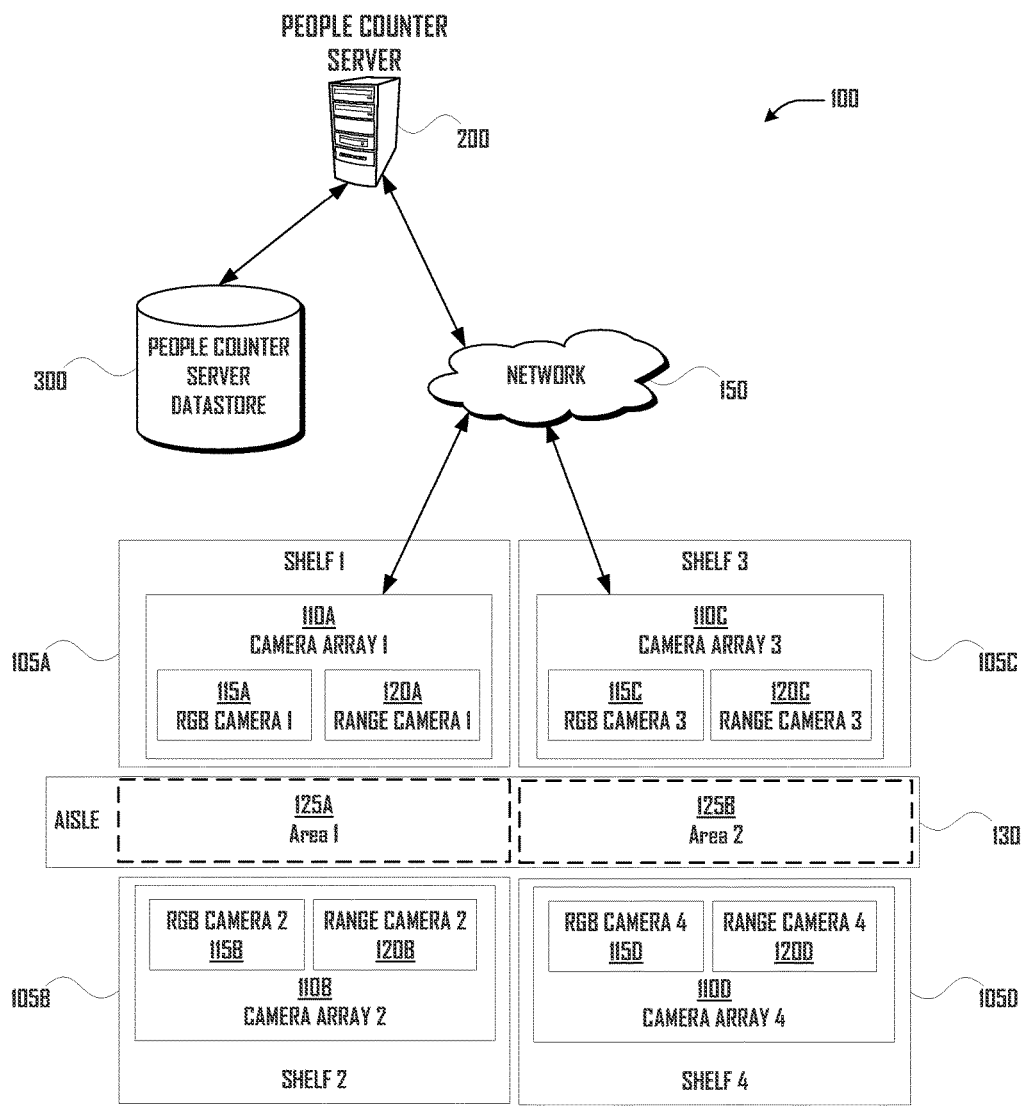
FIG. 1 is a network and device diagram illustrating examples of network(s), computing devices, and physical and logical relationship of these components, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope or spirit of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Use of a reference number without a letter suffix is a reference to a type of component, encompassing all components illustrated with the common reference number.

As used herein, the term "module" may refer to, be part of, or include an Application Specific Integrated Circuit (ASIC), a System on a Chip (SoC), an electronic circuit, a processor (shared, dedicated, or group) and/or memory (shared, dedicated, or group) that execute one or more software or firmware programs, a combinational logic circuit, and/or other suitable components that provide the described functionality.

In overview, People Counter Server 200 may connect with Camera Array 110. Camera Array 110 may comprise RGB Camera 115 and Range Camera 120. RGB Camera 115 may detect and output pixels with RGB values in frames in RGB Stream 325. Range Camera 120 may detect and output, for example, binary pixel values in Range Stream 370. Range Camera 120 may further output a depth of a detected binary pixel value. Range Camera 120 may be, for example, an RBG-D camera, an infra-red or "IR" camera, a depth camera, or the like, which may record pixels as well as the depth of such pixels (generally relative to the Range Camera).

People Assessment Module 400 may receive the output of Camera Array 110 as input, processing it with People Assessment Module 400.

People Assessment Module 400 may process input with Pre-Processing Module 500, Counting Module 600, Motion Detection Module 700, and Image Recognition Module 800.

Pre-Processing Module 500 may establish as common frame rate and resolution, when there are two paired Camera Arrays 110. Pre-Processing Module 500 may flip one Range Stream 370 along the y-axis, filter pixels below a noise threshold, determine overlap and subtract background by multiplication of binary pixel values in the two Range Streams 370. When there is one Camera Array 100, Pre-Processing Module 500 may remove noise and a historic background.

Counting Module 600 may identify discrete separate Contour 380 in Range Stream 370 Camera Array 110 from Range Camera 120, obtain Contour Depth 340 values, determine a number of People in Range Stream 370 by multiplying Contour 380 by Contour Depth 340 values; if two Camera Arrays 110 are both providing Range Streams 370. Counting Module 600 may select the larger result.

Motion Detection Module 700 may determine proximate Contour Depth 340 value range groups; for each such group in adjacent frames, determine if the Contour Depth 340 group can be identified as traveling in one direction or the other relative to Aisle 395 or has an unknown travel direction.

Image Recognition Module 800 may process RGB Residual Stream 330 to identify people. For each person, Image Recognition Module 800 may determine a Physical Characteristic, such as age, gender, and gaze and determine Dwell Time 350 with respect thereto.

The above described method and apparatus may reliably count people, pertinent behavior, physical characteristics and dwell time in relation to specific shelves and products thereon, utilizing a computationally parsimonious approach and relatively inexpensive camera equipment which may be deployed in a range of configurations.

Illustrated in FIG. 1 are exemplary People Count Server 200, People Count Server Datastore 300, Network 150, and Shelf 1-4 105A-D. On at least one of Shelves 1-4 105 may be found Camera Array 1-4 110A-D. Each Camera Array 110 may comprise RGB Camera 115 and Range Camera 120. Each Camera Array 110 may have a field of view including Area 1-2 125A-B.

RGB Camera 115 may obtain pixels with RGB values. Obtained pixels may be transmitted to People Counter Server 200 as RGB Stream 325.

Range Camera 120 may obtain pixel with a binary value; Range Camera 120 may also obtain a depth of obtained pixel values. Depth may be obtained, for example, through stereo triangulation, sheet of light triangulation, structured light, time-of-flight, interferometry, and coded aperture. Depth may be encoded in or associated with binary pixel values. Range Camera 120 may transmit pixel and Depth values to People Counter Server 200 as Range Stream 370.

Camera Arrays 110 may comprise separate hardware for RGB Camera 115 and Range Camera 120 or may comprise dual-purpose cameras, wherein RGB Camera 115 and Range Camera 120 share some or all common components. Dual-purpose Camera Array 110 may have variations such as a first variation in which RGB Stream 325 and Range Stream 370 may be recorded simultaneously and a second variation in which RGB Stream 325 and Range Stream 370 may be recorded sequentially. In the first variation, the range of Range Camera 120 may be short, relative to the second variation, on the order of 2'. In the second variation, the range of Range Camera 120 may be longer, relative to the first variation, on the order of 6' or more.

Camera Arrays 110 may comprise computer hardware and software, similar to that illustrated in relation to People Counter Server 200, to encode and transmit RGB Stream 325 and Range Stream 370 to People Counter Server 200.

Camera Arrays 110A-D may be deployed on the top, middle or bottom of Shelf 105A-D. If deployed on the bottom, Range Camera 120 may record legs, in which case a correction, such as dividing Contour 380 and Contour Depth 340 values by two, may be applied. Arrangements of Camera Array are discussed further in relation to FIG. 9.

Range Stream 370 and RGB Stream 325 may be transmitted to People Counter Server 200 via a proxy, aggregator, or other intermediary device (not illustrated in FIG. 1).

Figure 2:
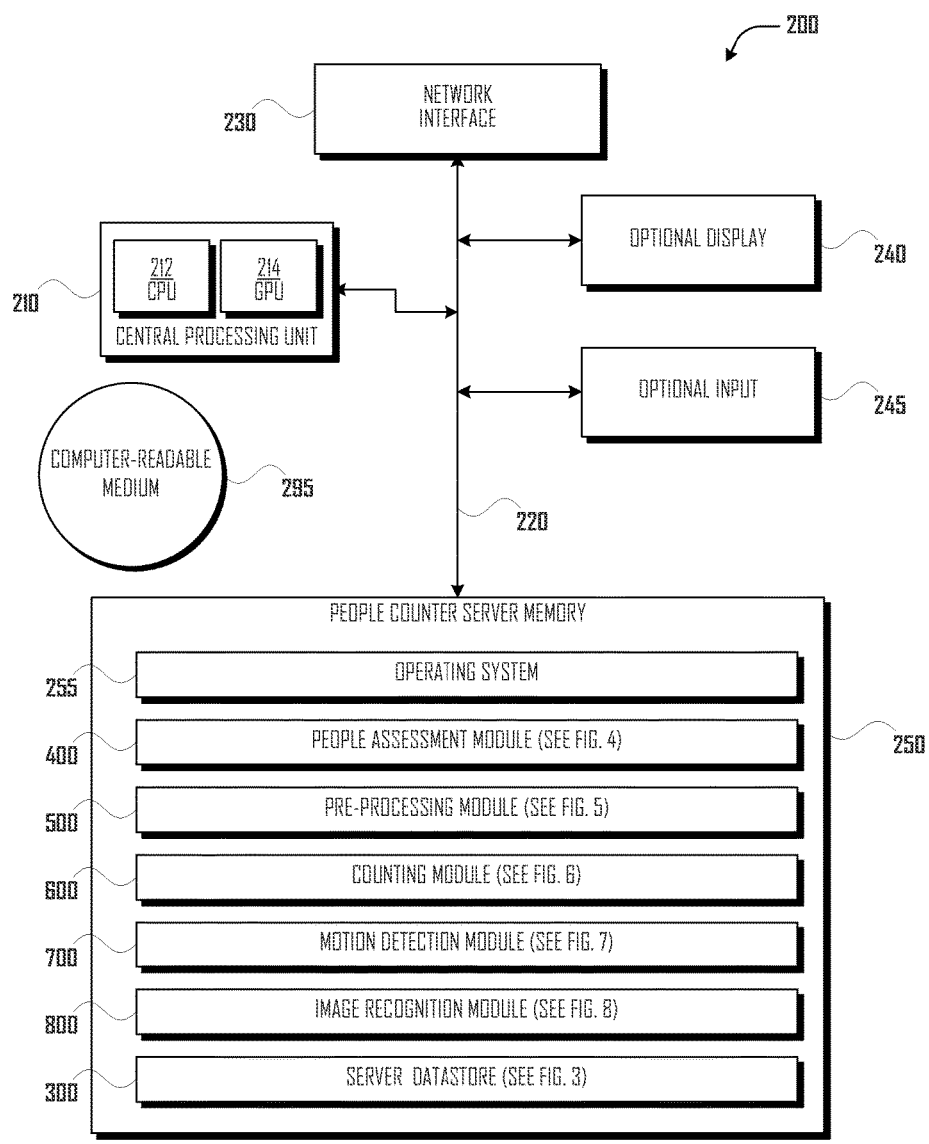
FIG. 2 is a functional block diagram illustrating an example of Person Counter Server.

People Counter Server 200 is illustrated in greater detail in FIG. 2. People Counter Server Datastore 300 is illustrated in greater detail in FIG. 3.

Network 150 may comprise computers, network connections among the computers, and software routines to enable communication between the computers over the network connections. Examples of the Network 150 comprise an Ethernet network, the Internet, and/or a wireless network, such as a GSM, TDMA, CDMA, EDGE, HSPA, LTE or other network provided by a wireless service provider. Connection to the Network 150 may be via a wired or a wireless connection, such as a Wi-Fi connection. More than one network may be involved in a communication session between the illustrated devices. Connection to the Network 150 may require that the computers execute software routines which enable, for example, the seven layers of the OSI model of computer networking or equivalent in a wireless phone network.

This paper may discuss a first computer as connecting to a second computer (such as Camera Array 110 connecting to People Counter Server 200) or to a corresponding datastore (such as to People Counter Server Datastore 300); it should be understood that such connections may be to, through, or via the other of the two components (for example, a statement that a computing device connects with or sends data to People Counter Server 200 should be understood as saying that the computing device may connect with or send data to People Counter Server Datastore 300). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization FIG. 2 is a functional block diagram of an exemplary People Counter Server 200 computing device and some data structures and/or components thereof. People Counter Server 200 in FIG. 2 may comprise at least one Processing Unit 210, People Counter Server Memory 250, Display 240 and Input 245, which all may be interconnected along with Network Interface 230 via Bus 220. Processing Unit 210 may comprise one or more general-purpose Central Processing Units ("CPU") 212 as well as one or more special-purpose Graphics Processing Units ("GPU") 214. The components of Processing Unit 210 may be utilized by Operating System 255 for different functions required by the routines executed by People Counter Server 200. Network Interface 230 may be utilized to form connections with Network 150 or to form device-to-device connections with other computers. People Counter Server Memory 250 may generally comprise a random access memory ("RAM"), a read only memory ("ROM"), and a permanent mass storage device, such as a disk drive or SDRAM (synchronous dynamic random-access memory). People Counter Server Memory 250 may store program code for software routines or modules, such as, for example, People Assessment Module 400, Pre-Processing Module 500, Counting Module 600, Motion Detection Module 700, Image Recognition Module 800, as well as, for example, browser, email client and server routines, client applications, and database applications (discussed further below). Additional data groups for routines, such as for a webserver and web browser, may also be present on and executed by the People Counter Server 200. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

In addition, People Counter Server Memory 250 may also store Operating System 255. These software components may be loaded from a non-transient Computer Readable Storage Medium 295 into People Counter Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

People Counter Server 200 may also comprise hardware supporting input modalities, Input 245, such as, for example, a touchscreen, a camera, a keyboard, a mouse, a trackball, a stylus, motion detectors, and a microphone. Input 245 may also serve as Display 240, as in the case of a touchscreen display which also serves as Input 245, and which may respond to input in the form of contact by a finger or stylus with the surface of Input 245.

Figure 3:
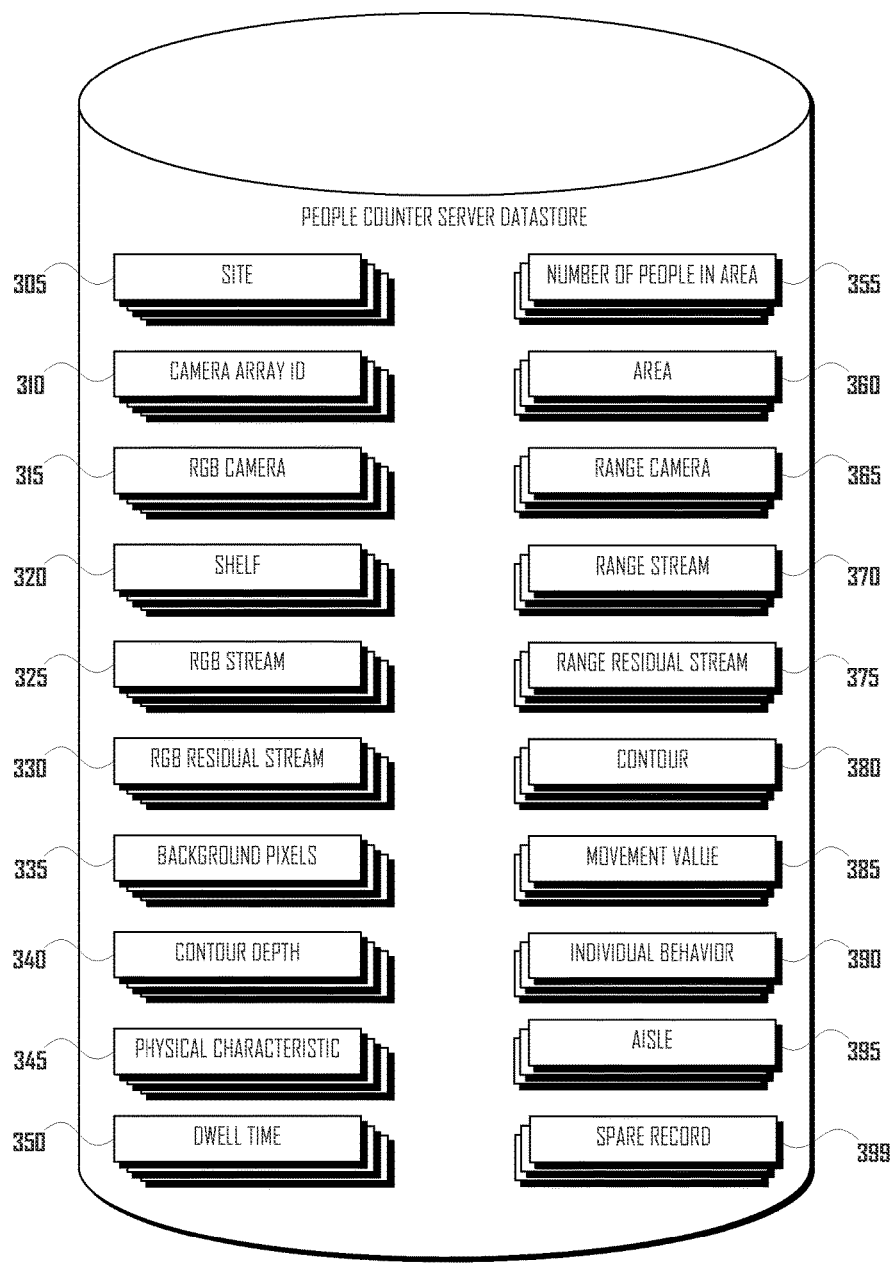
FIG. 3 is a block diagram illustrating an example of Person Counter Server Datastore.

People Counter Server 200 may also comprise or communicate via Bus 220 with People Counter Server Datastore 300, illustrated further in FIG. 3. In various embodiments, Bus 220 may comprise a storage area network ("SAN"), a high speed serial bus, and/or via other suitable communication technology. In some embodiments, People Counter Server 200 may communicate with People Counter Server Datastore 300 via Network Interface 230. People Counter Server 200 may, in some embodiments, include many more components than those shown in this Figure. However, it is not necessary that all of these generally conventional components be shown in order to disclose an illustrative embodiment.

FIG. 3 is a functional block diagram of People Counter Server Datastore 300 illustrated in the computing device of FIG. 2. The components 305-399 of People Counter Server Datastore 300 may include data groups used by routines. The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The components 305-399 of People Counter Server Datastore 300 are discussed further herein in the discussion of the remaining Figures.

Figure 4:
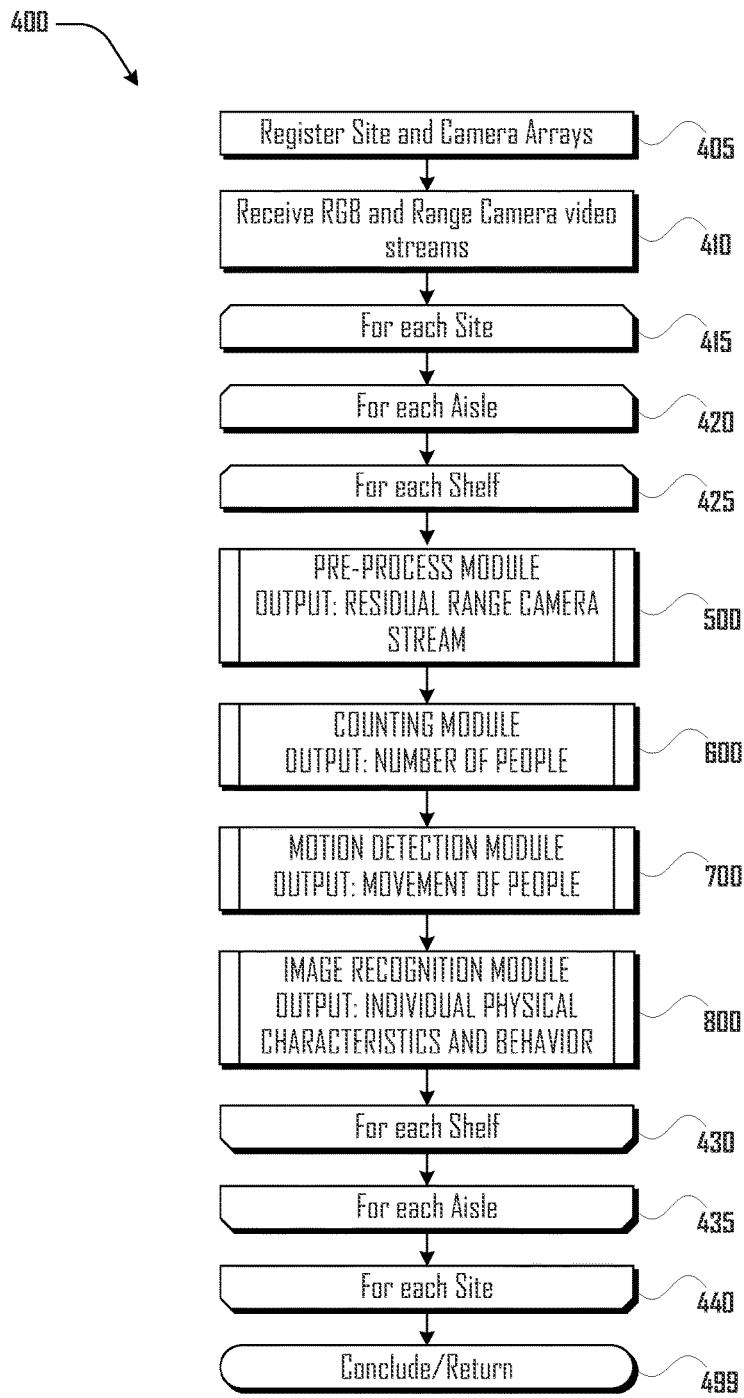
FIG. 4 is a flow diagram illustrating an example of a method which may be practiced by a People Assessment Module.

FIG. 4 is a flowchart illustrating an example of People Assessment Module 400, as may be executed by People Counter Server 200. At block 405, People Assessment Module 400 may register Site, Aisle and Camera Arrays, create records such as, for example, Site 305, Aisle 395, Shelf 320, Camera Array ID 310, authentication and authorization credentials, and the like. At this block, People Assessment Module 400 may obtain or set frame rate, resolution, file type, encapsulation, and other parameters for transmitting RGB Stream 325 and Range Stream 370 from Camera Array 110 to People Counter Server 200.

At block 410, People Assessment Module 400 may receive RGB Stream 325 and Range Stream 365 from one or more Camera Array 110, identified via Camera Array ID 310.

Opening loop block 415 to closing loop block 440 may iterate for every Site 305, such as a retailer, associated with, for example, a set of Aisle 395 and Shelf 105 records. If organized in this manner, opening loop block 420 to closing loop block 435 may iterate for each Aisle 395 associated with Site 305 and opening loop block 425 to closing loop block 430 may iterate for each Shelf 320 associated with such Aisle 395 records.

At block 500, People Assessment Module 400 may execute Pre-Processing Module 500, the output thereof being RGB Residual Stream 330 and Range Residual Stream 375.

At block 600, People Assessment Module 400 may process Range Residual Stream 375 by execution of Counting Module 600, the output thereof being Number of People in Area 355 record(s).

At block 700, People Assessment Module 400 may process Range Residual Stream 375 by execution of Motion Detection Module 700, the output thereof being Movement Value 385 record(s).

At block 800, People Assessment Module 400 may process RGB Residual Stream 330 by execution of Image Recognition Module 800, the output thereof being Physical Characteristic 345, Individual Behavior 390 record(s), and Dwell Time 350 record(s). Physical Characteristic 345 records may record, for example, an age or age range, a gender and the like. Age ranges may be, for example, 0-18, 19-35, 36-60, and 60+. Individual Behavior 390 record(s) may record, for example, whether gaze was detected, very close proximity to and/or contact with Shelf 105, and the like. Dwell Time 350 may record how long a Physical Characteristic 345 record is present in substantially sequential frames in RGB Residual Stream 330; gapes of less than a threshold amount may not interrupt Dwell Time 350 record.

After iteration through each Site 305, Aisle 395, Shelf 320 record(s), People Assessment Module 400 may save all records, make them available for viewing and/or output, and may conclude or return to a process which may have spawned People Assessment Module 400.

Figure 5:
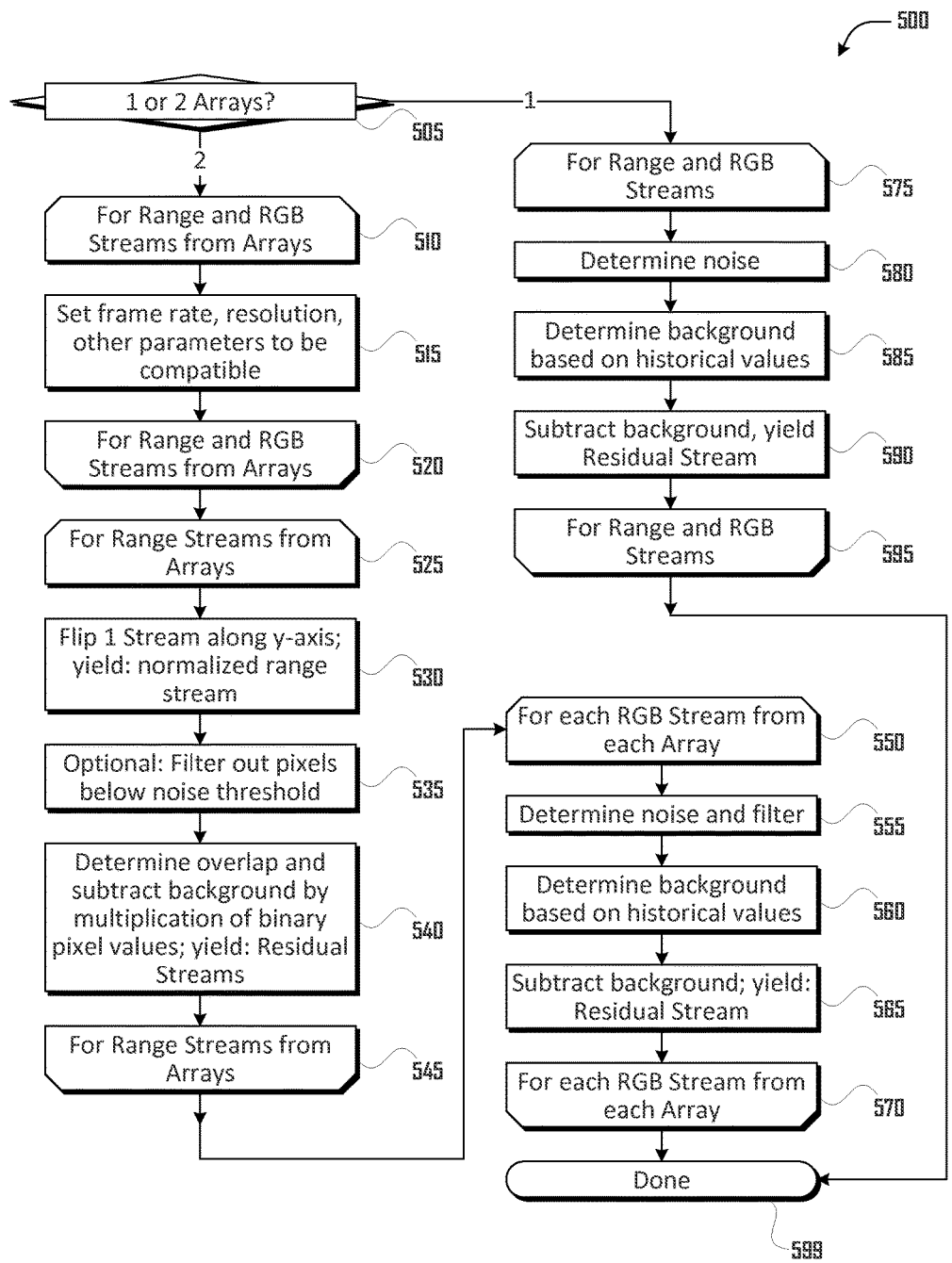
FIG. 5 is a flow diagram illustrating an example of a method which may be practiced by a Pre-Processing Module.

FIG. 5 is a flow chart illustrating an example of Pre-Processing Module 500, as may be executed by People Counter Server 200. At decision block 505, Pre-Processing Module 500 may determine whether it is communicating with, such as receiving RGB Stream 325 and Range Stream 370 from, one or two Camera Arrays 110. At this block, Pre-Processing Module 500 may be instructed to receive data from, for example, Camera Array 1 110A with a field of view comprising Area 1 125A and/or Pre-Processing Module 500 may be instructed to pair two Camera Arrays 110, such as Camera Array 1 110A and Camera Array 2 110B, both of which may have a field of view comprising a common area, such as Area 1 125A. Camera Array 1 110A and Camera Array 2 110B may be associated with Camera Array ID 310 records. Camera Array 1 110A and Camera Array 2 110B may be substantially opposite each other across Aisle 130 and Area 1 125A. Camera Array 1 110A and Camera Array 2 110B may have substantially mirrored fields of view. Variations of arrangement of Camera Arrays 110 are discussed and illustrated in relation to FIG. 9.

When communicating with two Camera Arrays 110, opening loop block 510 to closing loop block 520 may iterate for RGB Stream 325 and Range Stream 370 received from each Camera Array 110. At block 515, Pre-Processing Module 500 may, if this has not already been performed, set frame rate, resolution, file type, encapsulation, and other parameters for transmitting RGB Stream 325 and Range Stream 370 to People Counter Server 200, such that the parameters between the Streams and between the Camera Arrays may be compatible.

Opening loop block 525 to closing loop block 545 may iterate for each Range Stream 370 associated with paired Camera Array IDs 310. At block 530, Pre-Processing Module 500 may flip one Range Stream 370 along the y-axis to yield a normalized Range Stream. At block 535, Pre-Processing Module 500 may optionally filter out pixel noise below a noise threshold. At block 540, Pre-Processing Module 500 may determine the overlap between the fields of view in the paired RGB Steam 325 and normalized Range Stream and may subtract background, generally unchanging, pixel values common between the Streams. This may be performed, for example, by multiplying the binary pixel values from each Stream by the other. In this approach, pixel values of zero times zero equal zero; pixel values of zero times one equal zero; only pixel values of one times one equal one. The operations in this block may be aided by a physical arrangement of Camera Arrays 110 and/or by mathematical alignment of the paired Range Stream 370 and normalized Range Stream 370, such as with an empty Aisle 130, to maximize the number of zero value pixels.

Opening loop block 550 to closing loop block 570 may iterate for each RGB Stream 325 associated with paired Camera Array IDs 310. At block 555, Pre-Processing Module 500 may obtain or determine a noise threshold and filter RGB Stream 325 below the noise threshold. At block 560, Pre-Processing Module 500 may determine or obtain a background in each RGB Stream 325, for example, a historical value obtained from an empty Aisle 130. At block 565, Pre-Processing Module 500 may subtract the background, yielding RGB Residual Stream 330.

Opening loop block 575 to closing loop block 595 may follow decision block 505 when only one Camera Array 110 is communicating with Pre-Processing Module 500. Opening loop block 575 to closing loop block 595 may iterate for Range Stream 370 and RGB Stream 325 from the one Camera Array 110.

At block 580, Pre-Processing Module 500 may obtain or determine a noise threshold and filter RGB Stream 325 and Range Stream 370 below the noise threshold. At block 585, Pre-Processing Module 500 may determine or obtain a background in RGB Stream 325 and Range Stream 370, for example, based on a historical value obtained from an empty Aisle 130. At block 590, Pre-Processing Module 500 may subtract the background, yielding RGB Residual Stream 330 and Range Residual Stream 375.

At concluding block 599, Pre-Processing Module 500 may conclude and/or may return to a process or module which spawned it.

Figure 6:
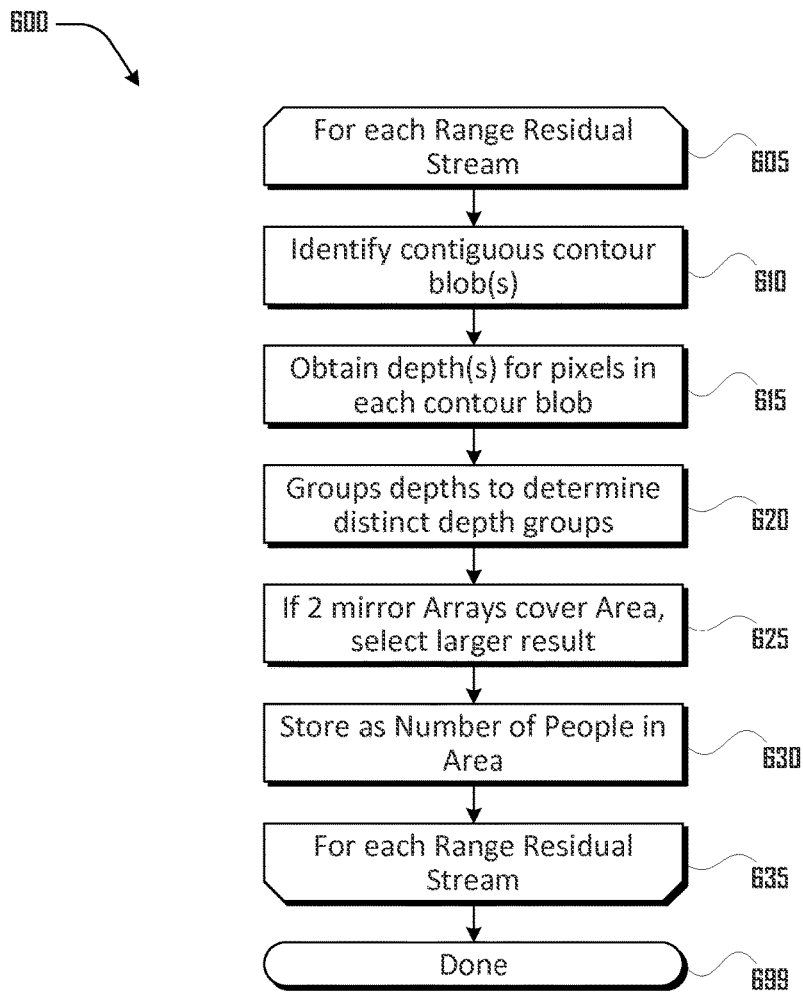
FIG. 6 is a flow diagram illustrating an example of a method which may be practiced by a Counting Module.

FIG. 6 is a flow chart illustrating an example of Counting Module 600, as may be executed by People Counter Server 200.

Opening loop block 605 to closing loop block 635 may iterate for each Range Residual Stream 370. At block 610, Counting Module 600 may identify separate contiguous contour blobs in Range Residual Stream 370, such as contiguous pixel values of one in each Range Residual Stream 370. Contour blobs may be assigned or recorded in Contour 380 record(s). At block 615, Counting Module 600 may obtain depth value(s) for each pixel associated with each Contour 380, Contour Depth 340 records. Contour Depth 340 records may come from two Range Streams 370 from two paired Camera Arrays 110, notwithstanding that the Range Streams 370 may be combined into one Range Residual Stream 375 (with Contour Depth 340 records retained from both Range Streams 370). At block 620, Counting Module 600 may group the Contour Depth 340 value(s) of block 615 into a number of distinct Contour Depth 340 level groups. Because people generally stand next to one another, they generally produce pixel groups and pixel group depths at distinct distances levels from Range Camera 120. At block 625, if two mirrored Camera Arrays 110 contribute to one Range Residual Stream 375, Counting Module 600 may select the larger number of distinct Contour Depth 340 levels for each Contour 380 in Range Residual Stream 375 from each contributing Camera Array 110. Alternatively, Counting Module 600 may average the number of Contour Depth 340 level groups from both Range Streams 370.

At block 630, Counting Module 600 may add all Contour Depth 340 level groups for each distinct Contour 380 as Number of People in Area 355 record.

Figure 7:
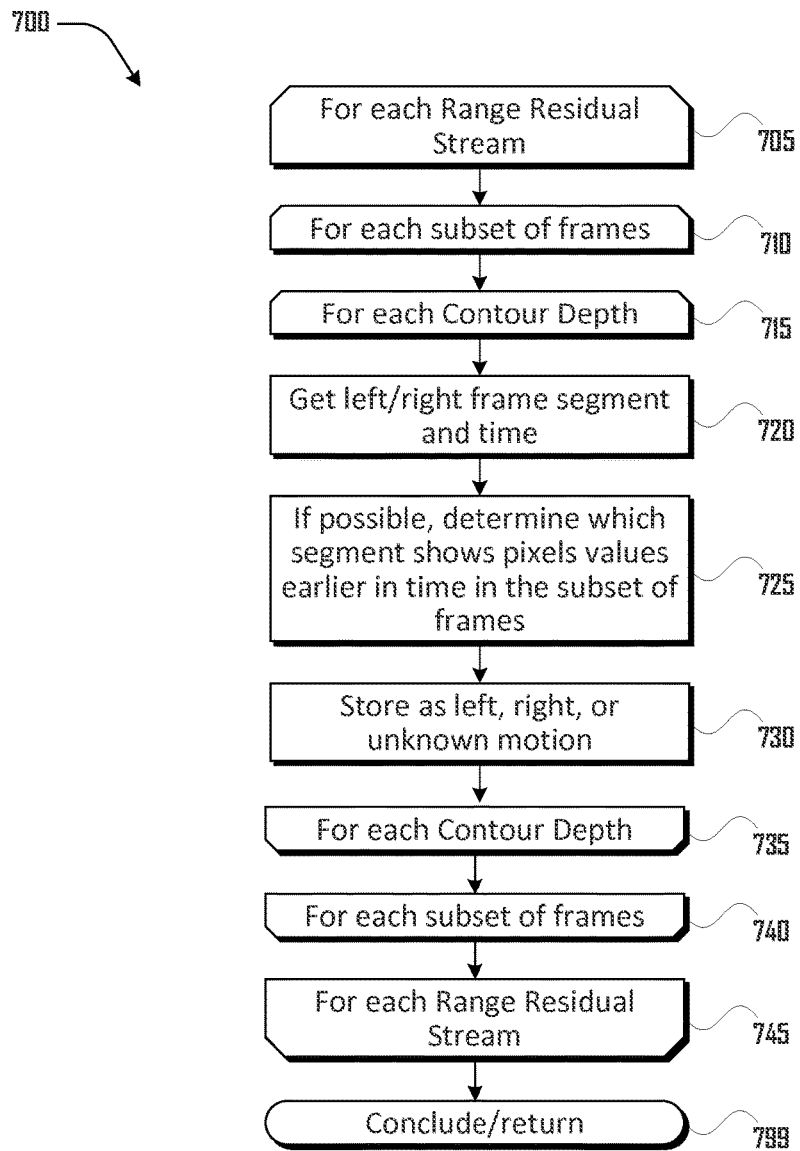
FIG. 7 is a flow diagram illustrating an example of a method which may be practiced by a Motion Detection Module.

FIG. 7 is a flow chart illustrating an example of Motion Detection Module 700, as may be executed by People Counter Server 200. Opening loop block 705 to closing loop block 745 may iterate for each Range Residual Stream 375. Opening loop block 710 to closing loop block 740 may iterate for each contiguous subset of frames within Range Residual Stream 375. Contiguous subset of frames in Range Residual Stream 375 may comprise each pair of successive frames in Range Residual Stream 375 or a subset thereof. Opening loop block 715 to closing loop block 735 may iterate for each Contour Depth 340 or each Contour Depth 340 level group, as may have been determined by Counting Module 600, such as at block 620.

At block 720, Motion Detection Module 700 may divide (or obtain) left/right segments in Range Residual Stream 375 and may determine if the Contour Depth 340 or Contour Depth 340 level groups in contiguous subset of frames within Range Residual Stream 375 are moving from the left to the right or visa versa or cannot be determined as time proceeds between the contiguous subset of frames.

At block 730, Motion Detection Module 700 may store the result of block 720 as Movement Value 385.

When each Contour Depth 340 or Contour Depth 340 level group, for each subset of frames, for each Range Residual Stream 375 have been processed, at concluding block 799 Motion Detection Module 700 may conclude and/or return to a process or module which may have spawned it.

Figure 8:
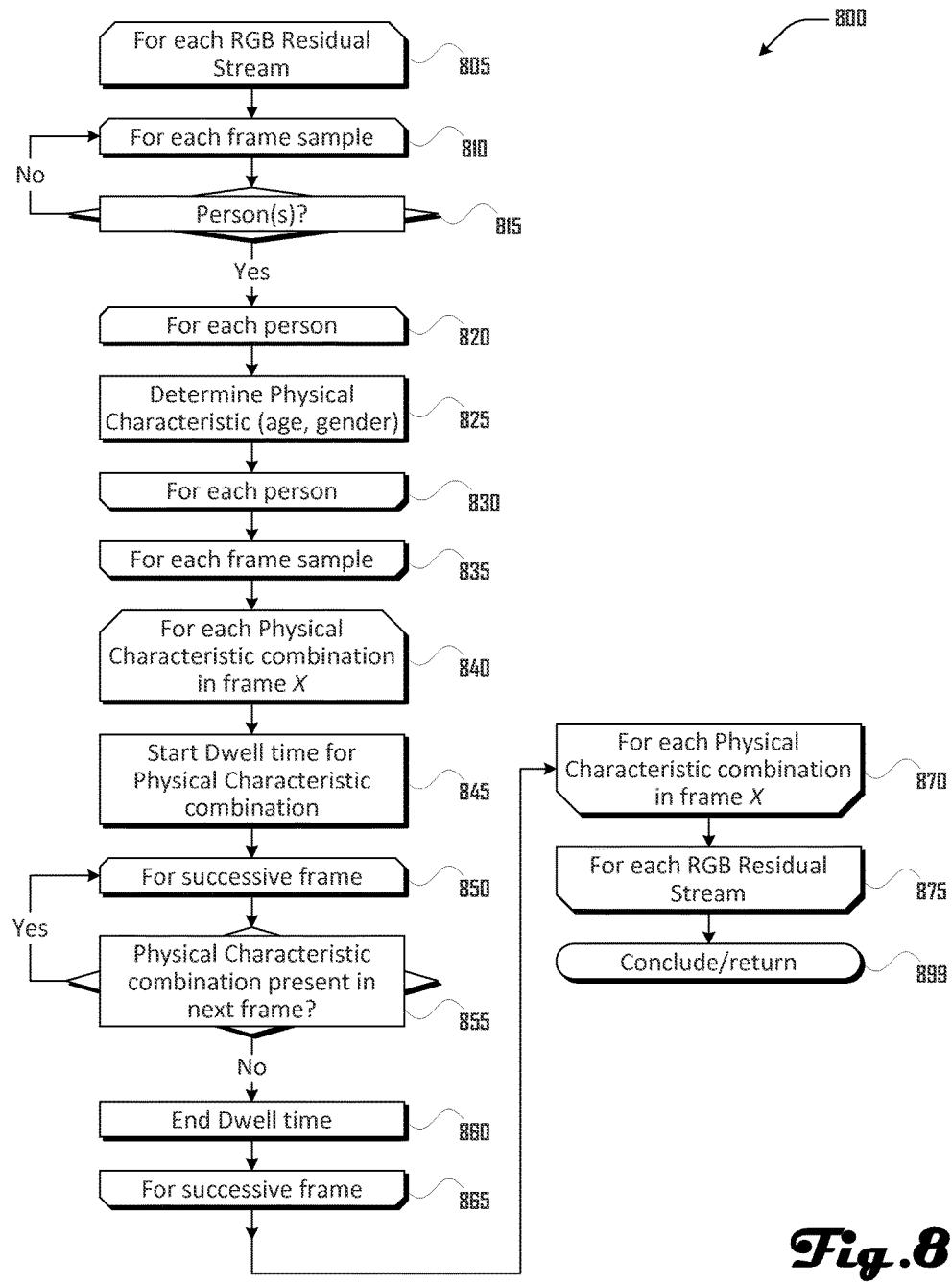
FIG. 8 is a flow diagram illustrating an example of a method which may be practiced by an Image Recognition Module.

FIG. 8 is a flow chart illustrating an example of Image Recognition Module 800, as may be executed by People Counter Server 200. Opening loop block 805 to closing loop block 875 may iterate for each RGB Residual Stream 330. Opening loop block 810 to closing loop block 835 may iterate for each contiguous frame sample in RGB Residual Stream 330. Contiguous frame sample in RGB Residual Stream 330 may comprise each pair of successive frames in RGB Residual Stream 330 or a subset thereof. At block 815, Image Recognition Module 800 may determine whether a person is present in the then-current frame sample. If negative, Image Recognition Module 800 may proceed to block 810 to iterate over the next contiguous frame sample. If affirmative, opening loop block 820 to closing loop block 830 may iterate over each person detected at decision block 815.

At block 825, Image Recognition Module 800 may, if possible, determine physical characteristics of the then-current person, such as an age, age range, and/or gender of the then-current person. Age ranges may comprise, for example, 0-18, 19-35, 35-60, and 60+. These may be stored as, for example, values in Physical Characteristic 345 record(s).

Opening loop block 840 to closing loop block 870 may iterate for distinct groups of Physical Characteristic 345 records which occur in a given frame. At block 845, Image Recognition Module 800 may start a dwell time for the Physical Characteristic 345 record group. Opening loop block 850 to closing loop block 865 may iterate for successive frames from the then-current frame. At decision block 855, Image Recognition Module 800 may determine whether the then-current Physical Characteristic 345 record group is present in the then-current successive frame. If affirmative, Image Recognition Module 800 may return to opening loop block 850 to iterate over the next successive frame. If negative, at block 860, Image Recognition Module 800 may end the dwell time for the then-current Physical Characteristic 345 record group. The result may be saved as, for example, Dwell Time 350 record(s).

After processing successive frames, for each Physical Characteristic 345 record group combination in a then-current frame, for each RGB Residual Stream 330, at concluding block 899, Image Recognition Module 800 may conclude or return to a process or module which may have spawned it.

Figure 9:
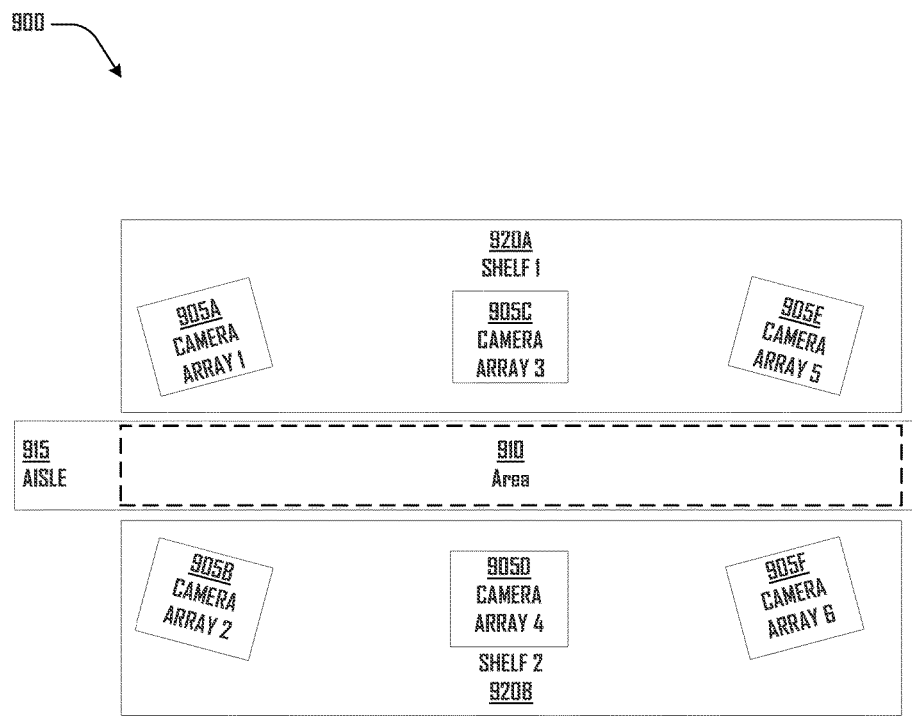
FIG. 9 illustrates a set of Camera Arrays for the purpose of discussing alternative physical configurations.

FIG. 9 illustrates Camera Array 1-6 905A-F, for the purpose of discussing alternative physical configurations of Camera Arrays 110. An optimal configuration may be as illustrated in FIG. 9, with all illustrated Camera Arrays 1-6 905A-F, with Camera Arrays 1-2 and 5-6 on the outside of Shelf 1-2 920A-B pointed inward, toward one another. All Camera Arrays 1-6 905A-F may have a field of view comprising Area 910. An alternative configuration may have one set of Camera Arrays 1, 3, and 5, 905A, 905C, and 905E on one Shelf 1 920A, with fields of view comprising Area 910. Still another alternative configuration may have one Camera Array 3 905C on one Shelf 1 920A, with a field of view comprising Area 910. These configurations are illustrative, other configurations may also be practiced.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus for recording and processing video comprising: a first camera array, a computer processor and memory, which memory comprises a counting module and a motion detection module to be operated by the computer processor; wherein the apparatus is to receive from the first camera array a first RGB camera video stream with a field of view comprising a first area and a first range camera video stream with a field of view comprising the first area; wherein the counting module is to determine a number of people in the first area based on a counting analysis of at least the first range camera video stream; wherein the motion detection module is to determine a motion of a person relative to the first area based on a motion detection analysis of at least the first range camera video stream; and wherein the apparatus is to receive, from an image recognition module, a physical characteristic of and a behavior of a person detected in the first RGB camera video stream; and wherein the camera array comprises a first RGB camera and a first range camera, wherein the fields of view of the first RGB and first range cameras overlap.

Example 2 may include the apparatus according to Example 1, wherein the first range camera video stream comprises a left and a right segment relative to the first area, and wherein the motion detection module, as part of the motion detection analysis, is to determine whether the person is detected sequentially in the left and right segments.

Example 3 may include the apparatus according to Example 1, wherein the counting module, as part of the counting analysis, is to: determine and subtract a range camera background relative to at least the first range camera video stream to produce a first residual range camera video stream; detect at least a first contour in at least the first residual video stream; determine at least one depth of the first contour; and multiply the first contour by the number of depths of the first contour to determine the number of people in the first area.

Example 4 may include the apparatus according to Example 3, wherein the apparatus further comprises a second camera array and the apparatus is to receive from the second camera array a second RGB camera video stream with a field of view comprising the first area and a second range camera video stream with a field of view comprising the first area; and wherein memory further comprise a pre-processing module to: flip the second range camera video stream along a y-axis to produce a normalized second range camera video stream; determine an overlap between the first range camera video stream and the normalized second range camera video stream; determine and subtract the range camera background relative to at least the first range camera video stream and the normalized second range camera video stream to produce the first residual range camera video stream and a second residual range camera video stream; wherein the counting module in the computing device is to determine the number of people in the first area based on the counting analysis of the first residual range camera video stream and the second residual range camera video stream; wherein the apparatus is to receive from the image recognition module the physical characteristic of and the behavior of a person detected in the second RGB camera video stream; wherein the counting module is to: detect at least the first contour in at least the first and second residual range camera video stream; determine at least one depth of the first contour in at least the first and second residual range camera video stream; multiply the first contour by the larger of the number of depths of the first contour in at least the first and second residual range camera video stream to determine the number of people in the first area; wherein the second camera array comprises a second RGB camera and a second range camera, wherein the fields of view of the second RGB and second range cameras overlap, and wherein the second camera array is opposite the first camera array across the first area.

Example 5 may include the apparatus according to Example 4, wherein the first and second range camera video streams comprise binary pixels and wherein determine the overlap between the first range camera video stream and the normalized second range camera video stream and determine and subtract the range camera background relative to at least the first range camera video stream and the normalized second range camera video stream to produce the first residual range camera video stream and a second residual range camera video stream comprises multiply the binary pixels in the first range camera video stream by the binary pixels in the normalized second range camera video stream.

Example 6 may include the apparatus according to any one of Example 1-Example 5, wherein the motion of a person relative to the first area is entering, exiting, or unknown, wherein the physical characteristic comprises an age group and a gender, and wherein the behavior comprises a dwell time in the first area.

Example 7 may include the apparatus according to any one of Example 1-Example 5, wherein the RGB camera and the range camera are provided by one multi-function camera.

Example 8 may include the apparatus according to any one of Example 1-Example 5, wherein at least one camera array is located at the bottom, middle, or top of a rack of shelves.

Example 9 may include a method for computing comprising receiving, by a computing device from a first camera array, a first RGB camera video stream with a field of view comprising a first area and a first range camera video stream with a field of view comprising the first area; determining, by the computing device, a number of people in the first area based on a counting analysis of at least the first range camera video stream; determining by the computing device, a motion of a person relative to the first area based on a motion detection analysis of at least the first range camera video stream; and determining, by the computing device, a physical characteristic of and a behavior of a person detected in the first RGB camera video stream; wherein the camera array comprises a first RGB camera and a first range camera, wherein the fields of view of the first RGB and first range cameras overlap.

Example 10 may include the method according to Example 9, wherein the first range camera video stream comprises a left and a right segment relative to the first area, and wherein the motion detection analysis comprises determining whether the person is detected sequentially in the left and right segments.

Example 11 may include the method according to Example 9, wherein the counting analysis of the first range camera video stream comprises: determining and subtracting a range camera background relative to at least the first range camera video stream to produce a first residual range camera video stream; detecting at least a first contour in at least the first residual video stream; determining at least one depth of the first contour; multiplying the first contour by the number of depths of the first contour to determine the number of people in the first area.

Example 12 may include the method according to Example 11, further comprising: receiving, by the computing device from a second camera array, a second RGB camera video stream with a field of view comprising the first area and a second range camera video stream with a field of view comprising the first area; flipping, by the computing device, the second range camera video stream along a y-axis to produce a normalized second range camera video stream; determining, by the computing device, an overlap between the first range camera video stream and the normalized second range camera video stream, and determining and subtracting, by the computing device, the range camera background relative to at least the first range camera video stream and the normalized second range camera video stream to produce the first residual range camera video stream and a second residual range camera video stream; determining, by the computing device, the number of people in the first area based on the counting analysis of the first residual range camera video stream and the second residual range camera video stream; determining, by the computing device, the physical characteristic of and the behavior of a person detected in the second RGB camera video stream; detecting, by the computing device, at least the first contour in at least the first and second residual range camera video stream; determining, by the computing device, at least one depth of the first contour in at least the first and second residual range camera video stream; multiplying, by the computing device, the first contour by the larger of the number of depths of the first contour in at least the first and second residual range camera video stream to determine the number of people in the first area; wherein the second camera array comprises a second RGB camera and a second range camera, wherein the fields of view of the second RGB and second range cameras overlap, and wherein the second camera array is opposite the first camera array across the first area.

Example 13 may include the method according to Example 12, wherein the first and second range camera video streams comprise binary pixels, and further wherein determining the overlap between the first range camera video stream and the normalized second range camera video stream and determining and subtracting the range camera background relative to at least the first range camera video stream and the normalized second range camera video stream to produce the first residual range camera video stream and a second residual range camera video stream comprises multiplying the binary pixels in the first range camera video stream by the binary pixels in the normalized second range camera video stream.

Example 14 may include the method according to any one of Example 9-Example 13, wherein the motion of a person relative to the first area is entering, exiting, or unknown, wherein the physical characteristic comprises an age group and a gender, and wherein the behavior comprises a dwell time in the first area.

Example 15 may include the method according to any one of Example 9-Example 13, wherein the RGB camera and the range camera are provided by one multi-function camera.

Example 16 may include the method according to any one of Example 9-Example 13, wherein at least one camera array is located at the bottom, middle, or top of a rack of shelves.

Example 17 may include an apparatus for recording and processing video comprising: means for receiving, by a computing device from a first camera array, a first RGB camera video stream with a field of view comprising a first area and a first range camera video stream with a field of view comprising the first area; means for determining, by the computing device, a number of people in the first area based on a counting analysis of at least the first range camera video stream; means for determining by the computing device, a motion of a person relative to the first area based on a motion detection analysis of at least the first range camera video stream; and means for determining, by the computing device, a physical characteristic of and a behavior of a person detected in the first RGB camera video stream; wherein the camera array comprises a first RGB camera and a first range camera, wherein the fields of view of the first RGB and first range cameras overlap.

Example 18 may include the apparatus according to Example 17, wherein the first range camera video stream comprises a left and a right segment relative to the first area, and wherein the motion detection analysis comprises means to determine whether the person is detected sequentially in the left and right segments.

Example 19 may include the apparatus according to Example 17, wherein the counting analysis of the first range camera video stream comprises means to: determine and subtract a range camera background relative to at least the first range camera video stream to produce a first residual range camera video stream; detect a at least a first contour in at least the first residual video stream; determine at least one depth of the first contour; and multiply the first contour by the number of depths of the first contour to determine the number of people in the first area.

Example 20 may include the apparatus according to Example 19, further comprising means to: receive, by the apparatus from a second camera array, a second RGB camera video stream with a field of view comprising the first area and a second range camera video stream with a field of view comprising the first area; flip, by the apparatus, the second range camera video stream along a y-axis to produce a normalized second range camera video stream, determine, by the apparatus, an overlap between the first range camera video stream and the normalized second range camera video stream, and determine and subtract, by the apparatus, the range camera background relative to at least the first range camera video stream and the normalized second range camera video stream to produce the first residual range camera video stream and a second residual range camera video stream; determine, by the apparatus, the number of people in the first area based on the counting analysis of the first residual range camera video stream and the second residual range camera video stream; determine, by the apparatus, the physical characteristic of and the behavior of a person detected in the second RGB camera video stream; detecting, by the apparatus, at least the first contour in at least the first and second residual range camera video stream; determine, by the apparatus, at least one depth of the first contour in at least the first and second residual range camera video stream; multiply, by the apparatus, the first contour by the larger of the number of depths of the first contour in at least the first and second residual range camera video stream to determine the number of people in the first area; wherein the second camera array comprises a second RGB camera and a second range camera, wherein the fields of view of the second RGB and second range cameras overlap, and wherein the second camera array is opposite the first camera array across the first area.

Example 21 may include the apparatus according to Example 20, wherein the first and second range camera video streams comprise binary pixels, and further wherein means to determine the overlap between the first range camera video stream and the normalized second range camera video stream and means to determine and subtract the range camera background relative to at least the first range camera video stream and the normalized second range camera video stream to produce the first residual range camera video stream and a second residual range camera video stream comprise means to multiply the binary pixels in the first range camera video stream by the binary pixels in the normalized second range camera video stream.

Example 22 may include the apparatus according to any one of Example 17 to Example 21, wherein the motion of a person relative to the first area is entering, exiting, or unknown, wherein the physical characteristic comprises an age group and a gender, and wherein the behavior comprises a dwell time in the first area.

Example 23 may include the apparatus according to any one of Example 17 to Example 21, wherein the RGB camera and the range camera are provided by one multi-function camera.

Example 24 may include the apparatus according to any one of Example 17 to Example 21, wherein at least one camera array is located at the bottom, middle, or top of a rack of shelves.

Example 25 may include one or more computer-readable media comprising instructions that cause a computing device, in response to execution of the instructions by one or more processors of the computing device, to: receive, by the computing device from a first camera array, a first RGB camera video stream with a field of view comprising a first area and a first range camera video stream with a field of view comprising the first area; determine, by the computing device, a number of people in the first area based on a counting analysis of at least the first range camera video stream; determine by the computing device, a motion of a person relative to the first area based on a motion detection analysis of at least the first range camera video stream; and determine, by the computing device, a physical characteristic of and a behavior of a person detected in the first RGB camera video stream; wherein the camera array comprises a first RGB camera and a first range camera, wherein the fields of view of the first RGB and first range cameras overlap.

Example 26 may include the computer-readable media of Example 25, wherein the first range camera video stream comprises a left and a right segment relative to the first area, and wherein the motion detection analysis is further to cause the computing device to determine whether the person is detected sequentially in the left and right segments.

Example 27 may include the computer-readable media of Example 25, wherein the counting analysis of the first range camera video stream further is further to cause the computing device to: determine and subtract a range camera background relative to at least the first range camera video stream to produce a first residual range camera video stream; detect at least a first contour in at least the first residual video stream; determine at least one depth of the first contour; multiply the first contour by the number of depths of the first contour to determine the number of people in the first area.

Example 28 may include the computer-readable media of Example 27, which is further to cause the computing device to: receive, by the computing device from a second camera array, a second RGB camera video stream with a field of view comprising the first area and a second range camera video stream with a field of view comprising the first area; flip, by the computing device, the second range camera video stream along a y-axis to produce a normalized second range camera video stream, determine, by the computing device, an overlap between the first range camera video stream and the normalized second range camera video stream, and determine and subtract, by the computing device, the range camera background relative to at least the first range camera video stream and the normalized second range camera video stream to produce the first residual range camera video stream and a second residual range camera video stream; determine, by the computing device, the number of people in the first area based on the counting analysis of the first residual range camera video stream and the second residual range camera video stream; determine, by the computing device, the physical characteristic of and the behavior of a person detected in the second RGB camera video stream; detect, by the computing device, at least the first contour in at least the first and second residual range camera video stream; determine, by the computing device, at least one depth of the first contour in at least the first and second residual range camera video stream; multiply, by the computing device, the first contour by the larger of the number of depths of the first contour in at least the first and second residual range camera video stream to determine the number of people in the first area; wherein the second camera array comprises a second RGB camera and a second range camera, wherein the fields of view of the second RGB and second range cameras overlap, and wherein the second camera array is opposite the first camera array across the first area.

Example 29 may include the computer-readable media of Example 28, wherein the first and second range camera video streams comprise binary pixels, and further wherein determine the overlap between the first range camera video stream and the normalized second range camera video stream and determine and subtract the range camera background relative to at least the first range camera video stream and the normalized second range camera video stream to produce the first residual range camera video stream and a second residual range camera video stream comprises multiply the binary pixels in the first range camera video stream by the binary pixels in the normalized second range camera video stream.

Example 30 may include the computer-readable media of any one of Example 25 to Example 29, wherein the motion of a person relative to the first area is entering, exiting, or unknown, wherein the physical characteristic comprises an age group and a gender, and wherein the behavior comprises a dwell time in the first area.

Example 31 may include the computer-readable media of any one of Example 25 to Example 29, wherein the RGB camera and the range camera are provided by one multi-function camera.

Example 32 may include the computer-readable media of any one of Example 25 to Example 29, wherein at least one camera array is located at the bottom, middle, or top of a rack of shelves.

Other embodiments may use different sequencing, additional or fewer operations, and different nomenclature or terminology to accomplish similar functions. In some embodiments, various operations or set of operations may be performed in parallel with other operations, either in a synchronous or asynchronous manner. The operations selected here were chosen to illustrate some principals of operations in a simplified form. It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. An apparatus for recording and processing video comprising:
 a first camera array comprised of a first RGB camera and a first range camera, a second camera array comprised of a second RGB camera and a second range camera, a computer processor and memory, which memory comprises a pre-processing module, a counting module and a motion detection module to be operated by the computer processor;
 wherein the apparatus is to receive from the first camera array a first RGB camera video stream with a field of view comprising a first area and a first range camera video stream with a field of view comprising the first area, and from the second camera array a second RGB camera video stream with a field of view comprising the first area and a second range camera video stream with a field of view comprising the first area;
 wherein the pre-processing module is to:
  pre-process the second range camera video stream to produce a normalized second range camera video stream; and
  determine an overlap between the first range camera video stream and the normalized second range camera video stream;
 wherein the counting module is to determine a number of people in the first area based on a counting analysis of at least the first range camera video stream and the normalized second range camera video stream;
 wherein the motion detection module is to determine a motion of a person relative to the first area based on a motion detection analysis of at least the first range camera video stream;
 wherein the apparatus is to receive, from an image recognition module, a physical characteristic of and a behavior of a person detected in the first RGB camera video stream; and
 wherein the fields of view of the first RGB and first range cameras overlap, the fields of view of the second RGB and second range cameras overlap, and the second camera array is opposite the first camera array across the first area.

2. The apparatus according to claim 1, wherein the first range camera video stream comprises a left and a right segment relative to the first area, and wherein the motion detection module, as part of the motion detection analysis, is to determine whether the person is detected sequentially in the left and right segments.

3. The apparatus according to claim 1, wherein the counting module, as part of the counting analysis, is to:
 determine and subtract a range camera background relative to at least the first range camera video stream to produce a first residual range camera video stream;
 determine and subtract a range camera background relative to at least the normalized second range camera video stream to produce a second residual range camera video stream;
 detect at least a first contour in at least the first residual range camera video stream and the second residual range camera video stream;
 determine at least one depth of the first contour in at least the first and second residual range camera video streams; and
 multiply the first contour by a larger of a number of depths of the first contour in at least the first and second residual range camera video streams to determine the number of people in the first area.

4. The apparatus according to claim 3
 wherein to pre-process the second range camera video stream comprises flipping the second range camera video stream along a y-axis to produce a normalized second range camera video stream;
 wherein the counting module in a computing device is to determine the number of people in the first area based on the counting analysis of the first residual range camera video stream and the second residual range camera video stream; and wherein the apparatus is to receive from the image recognition module the physical characteristic of and the behavior of a person detected in the second RGB camera video stream.

5. The apparatus according to claim 4, wherein the first and second range camera video streams comprise binary pixels and wherein determine the overlap between the first range camera video stream and the normalized second range camera video stream and determine and subtract the range camera background relative to at least the first range camera video stream and the normalized second range camera video stream to produce the first residual range camera video stream and the second residual range camera video stream comprises multiply the binary pixels in the first range camera video stream by the binary pixels in the normalized second range camera video stream.

6. The apparatus according to claim 1, wherein the motion of a person relative to the first area is entering, exiting, or unknown, wherein the physical characteristic comprises an age group and a gender, and wherein the behavior comprises a dwell time in the first area.

7. The apparatus according to claim 1, wherein either or both of the first or second RGB camera and the corresponding first or second range camera are provided by one multi-function camera.

8. The apparatus according to claim 1, wherein at least one camera array is located at a bottom, middle, or top of a rack of shelves.

9. A method for computing comprising:
receiving, by a computing device from a first camera array, a first RGB camera video stream with a field of view comprising a first area and a first range camera video stream with a field of view comprising the first area;
receiving, by the computing device from a second camera array, a second RGB camera video stream with a field of view comprising the first area and a second range camera video stream with a field of view comprising the first area;
pre-processing, by the computing device, the second range camera video stream to produce a normalized second range camera video stream;
determining, by the computing device, an overlap between the first range camera video stream and the normalized second range camera video stream;
determining, by the computing device, a number of people in the first area based on a counting analysis of at least the first range camera video stream and the normalized second range camera video stream;
determining, by the computing device, a motion of a person relative to the first area based on a motion detection analysis of at least the first range camera video stream; and
determining, by the computing device, a physical characteristic of and a behavior of a person detected in the first RGB camera video stream;
wherein the first camera array comprises a first RGB camera and a first range camera, the fields of view of the first RGB and first range cameras overlap, the second camera array comprises a second RGB camera and a second range camera, the fields of view of the second RGB and second range cameras overlap, and the second camera array is opposite the first camera array across the first area.

10. The method according to claim 9, wherein the first range camera video stream comprises a left and a right segment relative to the first area, and wherein the motion detection analysis comprises determining whether the person is detected sequentially in the left and right segments.

11. The method according to claim 9, wherein the counting analysis of the first range camera video stream comprises:
determining and subtracting a range camera background relative to at least the first range camera video stream to produce a first residual range camera video stream;
determining and subtracting a range camera background relative to at least the normalized second range camera video stream to produce a second residual range camera video stream;
detecting at least a first contour in at least the first residual range camera video stream and the second residual range camera video stream;
determining at least one depth of the first contour in at least the first and second residual range camera video streams;
multiplying the first contour by a larger of a number of depths of the first contour in at least the first and second residual range camera video streams to determine the number of people in the first area.

12. The method according to claim 11, further comprising:
determining, by the computing device, the number of people in the first area based on the counting analysis of the first residual range camera video stream and the second residual range camera video stream;
determining, by the computing device, the physical characteristic of and the behavior of a person detected in the second RGB camera video stream; and
wherein pre-processing the second range camera video stream comprises flipping, by the computing device, the second range camera video stream along a y-axis to produce the normalized second range camera video stream.

13. The method according to claim 12, wherein the first and second range camera video streams comprise binary pixels, and further wherein determining the overlap between the first range camera video stream and the normalized second range camera video stream and determining and subtracting the range camera background relative to at least the first range camera video stream and the normalized second range camera video stream to produce the first residual range camera video stream and the second residual range camera video stream comprises multiplying the binary pixels in the first range camera video stream by the binary pixels in the normalized second range camera video stream.

14. The method according to claim 9, wherein the motion of a person relative to the first area is entering, exiting, or unknown, wherein the physical characteristic comprises an age group and a gender, and wherein the behavior comprises a dwell time in the first area.

15. The method according to claim 9, wherein either or both of the first or second RGB camera and the corresponding first or second range camera are provided by one multi-function camera.

16. The method according to claim 9, wherein at least one camera array is located at a bottom, middle, or top of a rack of shelves.

17. One or more non-transitory computer-readable media comprising instructions that cause a computing device, in response to execution of the instructions by one or more processors of the computing device, to:
receive, by the computing device from a first camera array, a first RGB camera video stream with a field of view comprising a first area and a first range camera video stream with a field of view comprising the first area;

receive, by the computing device from a second camera array, a second RGB camera video stream with a field of view comprising the first area and a second range camera video stream with a field of view comprising the first area;

pre-process, by the computing device, the second range camera video stream to produce a normalized second range camera video stream;

determine, by the computing device, an overlap between the first range camera video stream and the normalized second range camera video stream;

determine, by the computing device, a number of people in the first area based on a counting analysis of at least the first range camera video stream and the normalized second range camera video stream;

determine by the computing device, a motion of a person relative to the first area based on a motion detection analysis of at least the first range camera video stream; and determine, by the computing device, a physical characteristic of and a behavior of a person detected in the first RGB camera video stream;

wherein the first camera array comprises a first RGB camera and a first range camera, the fields of view of the first RGB and first range cameras overlap, the second camera array comprises a second RGB camera and a second range camera, the fields of view of the second RGB and second range cameras overlap, and the second camera array is opposite the first camera array across the first area.

18. The computer-readable media of claim 17, wherein the first range camera video stream comprises a left and a right segment relative to the first area, and wherein the motion detection analysis is further to cause the computing device to determine whether the person is detected sequentially in the left and right segments.

19. The computer-readable media of claim 17, wherein the counting analysis of the first range camera video stream is further to cause the computing device to:

determine and subtract a range camera background relative to at least the first range camera video stream to produce a first residual range camera video stream;

determine and subtract a range camera background relative to at least the normalized second range camera video stream to produce a second residual range camera video stream;

detect at least a first contour in at least the first residual range camera video stream and the second residual range camera video stream;

determine at least one depth of the first contour in at least the first and second residual range camera video streams;

multiply the first contour by a larger of a number of depths of the first contour in at least the first and second residual range camera video stream to determine the number of people in the first area.

20. The computer-readable media of claim 19, which is further to cause the computing device to:

determine, by the computing device, the number of people in the first area based on the counting analysis of the first residual range camera video stream and the second residual range camera video stream;

determine, by the computing device, the physical characteristic of and the behavior of a person detected in the second RGB camera video stream; and wherein to pre-process the second range camera video stream comprises flipping, by the computing device, the second range camera video stream along a y-axis to produce a normalized second range camera video stream.

21. The computer-readable media of claim 20, wherein the first and second range camera video streams comprise binary pixels, and further wherein determine the overlap between the first range camera video stream and the normalized second range camera video stream and determine and subtract the range camera background relative to at least the first range camera video stream and the normalized second range camera video stream to produce the first residual range camera video stream and a second residual range camera video stream comprises multiply the binary pixels in the first range camera video stream by the binary pixels in the normalized second range camera video stream.

22. The computer-readable media of claim 17, wherein the motion of a person relative to the first area is entering, exiting, or unknown, wherein the physical characteristic comprises an age group and a gender, and wherein the behavior comprises a dwell time in the first area.

23. The computer-readable media of claim 17, wherein either or both of the first or second RGB camera and the corresponding first or second range camera are provided by one multi-function camera.

24. The computer-readable media of claim 17, wherein at least one camera array is located at a bottom, middle, or top of a rack of shelves.

* * * * *